US012725168B2

(12) United States Patent
Rapuano et al.

(10) Patent No.: US 12,725,168 B2
(45) Date of Patent: Sep. 1, 2026

(54) SYSTEM FOR EVALUATING AND ENFORCING SAFETY PERFORMANCE AT A WORK SITE

(71) Applicant: NED STEVENS GUTTER CLEANING AND GENERAL CONTRACTING OF NEW JERSEY, LLC, Fairfield, NJ (US)

(72) Inventors: Robert Rapuano, Caldwell, NJ (US); Carlos Gonzales, Clifton, NJ (US)

(73) Assignee: Ned's Home Inc., Fairfield, NJ (US)

( * ) Notice: Subject to any disclaimer, the term of this patent is extended or adjusted under 35 U.S.C. 154(b) by 958 days.

(21) Appl. No.: 17/951,566

(22) Filed: Sep. 23, 2022

(65) Prior Publication Data

US 2023/0017916 A1 Jan. 19, 2023

Related U.S. Application Data

(63) Continuation-in-part of application No. 16/534,250, filed on Aug. 7, 2019, now Pat. No. 11,452,893.
(Continued)

(51) Int. Cl.
*G06Q 30/018* (2023.01)
*G06Q 10/0635* (2023.01)

(52) U.S. Cl.
CPC ....... *G06Q 30/018* (2013.01); *G06Q 10/0635* (2013.01)

(58) Field of Classification Search
CPC ......................... G06Q 30/018; G06Q 10/0635
See application file for complete search history.

(56) References Cited

U.S. PATENT DOCUMENTS 2,312,583 A 3/1943 Penlon
4,633,974 A 1/1987 Weiner et al.
(Continued)

FOREIGN PATENT DOCUMENTS

AU 2009100735 A4 7/2009
DE 2341619 A1 2/1975
(Continued)

OTHER PUBLICATIONS

M. F. Hussin, A. A. Sulaiman, M. H. Jusoh, M. Z. A. Aziz and A. M. A. Azid, Safety and health inspection checklist for iOS application,2014 IEEE Conference on Systems, Process and Control (ICSPC 2014), Kuala Lumpur, Malaysia, 2014, pp. 24-29.*
(Continued)

*Primary Examiner* — Timothy Padot
(74) *Attorney, Agent, or Firm* — Day Pitney LLP; George Chaclas; Joseph P. Quinn

(57) ABSTRACT

A method of evaluating work site safety performance. The method includes the step of receiving, by at least one computer system comprising a processor and a memory, from a management portal application, data including checklist definitions defining safety analysis tasks to be performed at the work site. The method includes generating, by the at least one computer system, a checklist for the work site based at least in part on the checklist definitions, the checklist including a plurality of safety analysis tasks to be performed at the work site. The method includes obtaining, by the at least one computer system, a plurality of responses to the checklist entered thereon. The method includes generating, by the at least one computer system, a safety report for the work site.

14 Claims, 14 Drawing Sheets

Related U.S. Application Data

(60) Provisional application No. 62/717,559, filed on Aug. 10, 2018.

(56) References Cited

U.S. PATENT DOCUMENTS

| | | | | |
|---|---|---|---|---|
| 5,036,949 | A | 8/1991 | Crocker et al. | |
| 5,287,944 | A | 2/1994 | Woodyard | |
| 5,730,407 | A | 3/1998 | Ostrobrod | |
| 6,098,746 | A | 8/2000 | Castaneda | |
| 6,112,853 | A | 9/2000 | Beard | |
| 6,533,066 | B1 | 3/2003 | O'Dell | |
| 8,292,030 | B2 | 10/2012 | Ballantyne | |
| 8,789,655 | B2 | 7/2014 | Dowie | |
| 9,175,437 | B2 | 11/2015 | Gamba | |
| 9,248,323 | B1 | 2/2016 | Larsen | |
| 9,272,167 | B2 | 3/2016 | Smit | |
| 9,652,724 | B2 * | 5/2017 | Ward, II | G06Q 10/02 |
| 10,060,146 | B2 | 8/2018 | Simmons et al. | |
| 10,238,899 | B1 | 3/2019 | Sherman | |
| 10,926,115 | B2 | 2/2021 | Ettling | |
| 2004/0128613 | A1 * | 7/2004 | Sinisi | G06Q 10/00 715/203 |
| 2008/0042030 | A1 | 2/2008 | Holling et al. | |
| 2010/0082842 | A1 * | 4/2010 | Lavrov | G06F 16/29 709/248 |
| 2012/0084108 | A1 * | 4/2012 | Bohannon | G06Q 10/06 705/7.12 |
| 2012/0312633 | A1 | 12/2012 | Massey | |
| 2013/0062145 | A1 | 3/2013 | Inoue et al. | |
| 2014/0060967 | A1 | 3/2014 | Patton et al. | |
| 2014/0339016 | A1 | 11/2014 | Hopkins et al. | |
| 2016/0194890 | A1 | 7/2016 | Landry | |
| 2017/0259090 | A1 * | 9/2017 | Gaines | F16M 13/022 |
| 2017/0270536 | A1 * | 9/2017 | Williams | H04W 24/04 |
| 2018/0060767 | A1 * | 3/2018 | Dillard | G06Q 50/12 |

FOREIGN PATENT DOCUMENTS

| | | | |
|---|---|---|---|
| WO | WO2001052938 | A2 | 7/2001 |
| WO | WO2013116925 | A1 | 8/2013 |

OTHER PUBLICATIONS

Boillat T, Grantcharov P, Rivas H. Increasing Completion Rate and Benefits of Checklists: Prospective Evaluation of Surgical Safety Checklists With Smart Glasses. JMIR Mhealth Uhealth. Apr. 29, 2019.*

Extended EP Search Report in corresponding Application No. 19848601.1, mailed Jul. 22, 2022, 11 pages.

International Preliminary report on Patentability issued in corresponding international application No. PCT/US2019/045462 with Amended Sheets of drawings, Oct. 1, 2020 (23 pages).

The International Search Report and the Written Opinion of the International Searching Authority issued in corresponding international application No. PCT/US/19/45462, Oct. 28, 2019 (9 pages).

3M 0221-50RG Vertical Rope Lifeline with Double Locking Snap Hook and Rope Adjuster, 50 feet (3M) [online] (retrieved from the internet on Mar. 10, 2019)<URL https://www.amazon.com/3M-0221-5ORG-Vertical-Lifeline-Adjuster/dp/BOOKCQHBSG/ref=cm_cr_arp_d_product_top?ie=UTF8> Oct. 12, 2016 (Oct. 12, 2016), entire document, especially Specifications for this item table and product description (5 pages).

* cited by examiner

SYSTEM FOR EVALUATING AND ENFORCING SAFETY PERFORMANCE AT A WORK SITE

CROSS-REFERENCE

This application is a continuation-in-part of and claims the benefit of U.S. patent application Ser. No. 16/534,250, filed Aug. 7, 2019 and issued as U.S. Pat. No. 11,452,893 on Sep. 27, 2022, which claims the benefit of U.S. Provisional Application Ser. No. 62/717,559, filed Aug. 10, 2018, each of which is incorporated herein by reference in their entirety.

FIELD OF THE DISCLOSURE

The subject disclosure relates to safety systems, and more particularly to safety performance management systems providing the ability to track, monitor, evaluate, and implement compliance with safety regulations prescribed for a given work site.

BACKGROUND

Walking on a roof is a dangerous proposition. Occupational Safety and Health Administration's ("OSHA") regulations have attempted to address the risk associated with the fall hazard. Generally, any worker engaged in work above a certain height must follow conventional fall protection system regulations. Personal fall arrest systems are typically secured to the roof through the property owner's roof shingles via a roof anchor with penetrating holes that could result in water damage, or such systems are assembled on the ground with the use of heavy counterweights that are cumbersome, time consuming to install, and can be dangerous to use. The system must be secured such that if the worker were to slip, the worker would be safely caught and not fall to the ground. The requirement for fall protection is difficult to implement in many industries.

For residential contractors performing various tasks that require roof entry, providing fall restraint systems with adequate physical strength has typically required attachment of anchoring systems directly to the residence as described above. These systems can be costly in terms of time and materials. Further, most home owners do not want holes drilled into roofing. Thus, providing adequate securement has been a challenge. The other option involved heavy counterweight systems described above which are difficult to transport, cannot be used on many scenarios like on sloped land, and can be costly, provide less flexibility and be time consuming.

As would be appreciated, those skilled at performing construction, roofing, and the like may not necessarily be skilled at or relied upon for completion of other complex tasks.

SUMMARY

What are needed are systems and methods to assist all levels of workers in completing compliance and safety measures in a timely manner in a way that verifies and evaluates every aspect of the project. Further, methods and apparatus for providing contractors with improved fall restraint systems are needed. Preferably, the methods and apparatus result in systems that may be set up quickly, are easy to implement and may be removed and reused.

A fall restraint for a worker on a roof comprising a yoke line, wherein a first end of the yoke line is releasably connected to a first building structure and a second end of the yoke line is releasably connected to a second building structure. The fall restraint also comprises a support line, wherein a first end of the support line is slidably connected to the yoke line, and a second end of the support line is connected to a worker harness, wherein the support line is adapted to travel over a ridge line of the roof and at least partially support the weight of the worker.

In one embodiment, a method of evaluating and enforcing safety performance of workers at a work site and producing various safety reports is disclosed. The method includes the step of identifying, by using at least one computing device comprising a processor and a memory, a management user. The method includes the step of receiving from the management user through a management portal application running on the at least one computing device, a customization to a master checklist to be used at the work site. The method includes applying, by the at least one computing device, the customization to the master checklist to create a customized checklist. In response to applying the customization to the master checklist, the method includes generating, by the at least one computing device, the customized checklist for the work site based at least in part on the master checklist, the customized checklist including a plurality of safety analysis tasks to be performed at the work site. The method includes sending, by the at least one computing device, data including the customized checklist to a handheld computing device at the work site. The method includes obtaining, by the at least one computing device, a plurality of responses to the customized checklist from the handheld computing device at the work site, the responses entered on a touchscreen of the handheld computing device. Finally, the method includes generating, by the at least one computing device, a safety report for the work site. In another embodiment the customization may include hazards or lack thereof present at a work site, a pitch of a roof at the work site, a fall protection method to be used or a reason for no fall protection method, safety compliance of the workers at the work site, or a safety evaluation of the workers at the work site.

In another embodiment, the handheld computing device may be configured to measure the pitch of the roof at the work site and/or resolve forces and perform loading calculations of a fall restraint system used at the work site. In another embodiment the method includes outputting a safety report based the responses entered on a touchscreen of the handheld computing device. At least one of the plurality of tasks may be a completion task, and the customized checklist causes the handheld computing device to display a user interface on the touchscreen with a first touch component that causes the completion task to be marked as completed and a second touch component that causes the completion task to be marked as not completed. Alternatively or in conjunction, at least one of the plurality of tasks may be a numerical data entry task, and the customized checklist causes the handheld computing device to display a user interface on the touchscreen with a plurality of numerical touch components to enter corresponding numbers.

An embodiment of the subject disclosure includes a system having at least one computing device comprising a processor and a memory. The system also includes a handheld computing device at a work site and a management portal application executable in the at least one computing device. When executed the management portal application causes the at least one computing device to at least identify a management user. The management portal application causes the at least one computing device to receive from the management user through the management portal application a customization to a master checklist to be used at the work site, and apply the customization to the master checklist to create a customized checklist. In response to applying the customization to the master checklist, the management portal application causes the at least one computing device to generate the customized checklist for the work site based at least in part on the master checklist, the customized checklist including a plurality of safety analysis tasks to be performed at the work site. The management portal application causes the at least one computing device to send data including the customized checklist to the handheld computing device at the work site and obtain a plurality of responses to the customized checklist from the handheld computing device at the work site, the responses including data entered on a touchscreen of the handheld computing device. Lastly, the management portal application causes the at least one computing device to generate a safety report for the work site.

In another embodiment the customization includes hazards or lack thereof present at a work site, a pitch of a roof at the work site, a fall protection method to be used or a reason for no fall protection method, safety compliance of the workers at the work site, or a safety evaluation of the workers at the work site.

At least one of the plurality of tasks may be a completion task, and the customized checklist causes the handheld computing device to display a user interface on the touchscreen with a first touch component that causes the completion task to be marked as completed and a second touch component that causes the completion task to be marked as not completed. Alternatively or in conjunction, at least one of the plurality of tasks may be a numerical data entry task, and the customized checklist causes the handheld computing device to display a user interface on the touchscreen with a plurality of numerical touch components to enter corresponding numbers.

An embodiment of the subject disclosure includes a method of evaluating work site safety performance. The method includes the step of receiving, by at least one computer system comprising a processor and a memory, from a management portal application, data including checklist definitions defining safety analysis tasks to be performed at the work site. The method includes generating, by the at least one computer system, a checklist for the work site based at least in part on the checklist definitions, the checklist including a plurality of safety analysis tasks to be performed at the work site. The method includes obtaining, by the at least one computer system, a plurality of responses to the checklist entered thereon. Lastly, the method includes generating, by the at least one computer system, a safety report for the work site.

BRIEF DESCRIPTION OF THE DRAWINGS

Various aspects of the present disclosure are discussed herein with reference to the accompanying FIGS. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The FIGS. are provided for the purposes of illustration and explanation and are not intended as a definition of the limits of the disclosure.

FIG. 13 is a block diagram of a computer system arranged to perform processing associated with a handheld computing device, server, computer, or the like.

DETAILED DESCRIPTION

Figure 1:
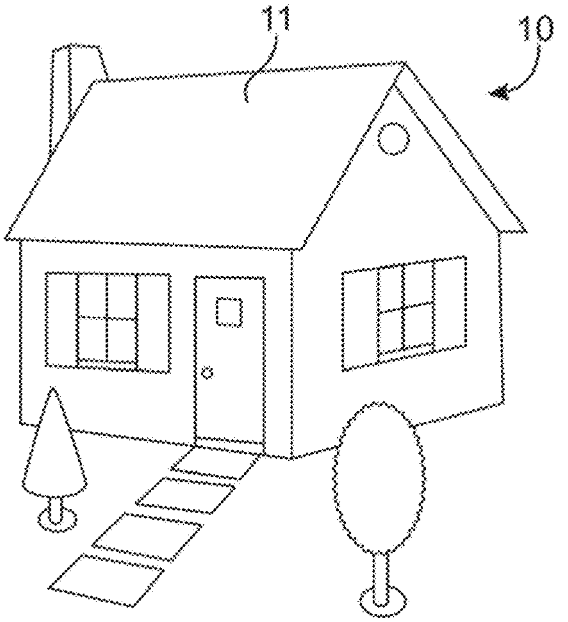
FIG. 1 is an schematic diagram depicting a residential property.

The subject technology overcomes many of the prior art problems associated with methods for assessing safety performance of workers. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the FIGS. and not meant in a limiting manner.

Figure 2:
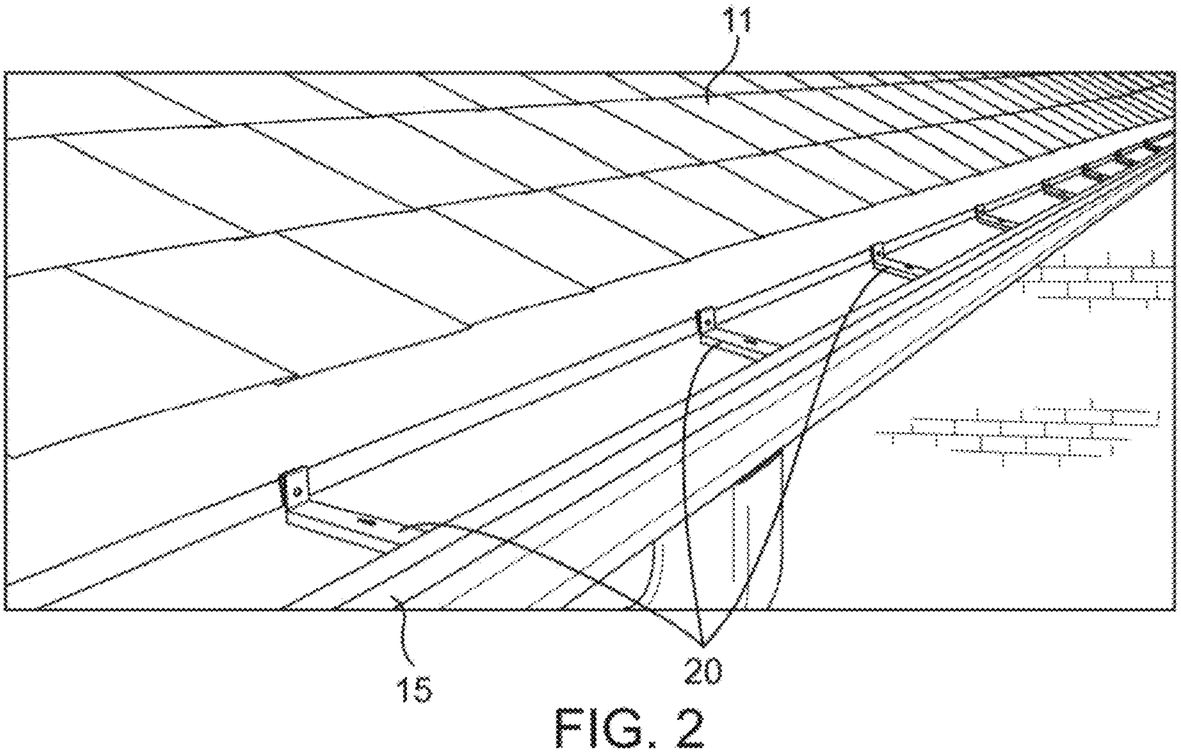
FIG. 2 is a perspective diagram depicting aspects of a gutter system for the residential property of FIG. 1.
Figure 6:
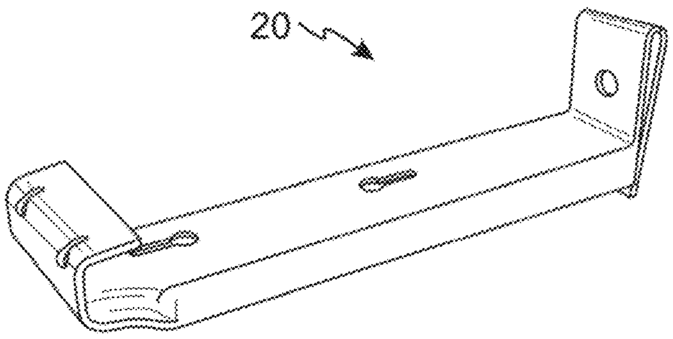
FIG. 6 is a front perspective view of a gutter hanger for use in the fall restraint system according to the teachings herein.

Referring now to FIG. 1, an exemplary embodiment of a residential property (referred to herein as a "building 10") is shown. The building 10 includes a pitched roof 11. For purposes of the present disclosure, pitched roof 11 preferably includes various pitch slopes up to a 10/12 pitch slope with a 39.81% angle measurement. As shown in FIG. 2, along a lower edge of the roof 11 is a gutter 15. Generally, the gutter 15 catches precipitation and directs the precipitation away from the foundation of building 10. The building 10 may have gutters 15 disposed on one or more sides thereof. In this illustration, the gutter 15 is attached to the building by a series of gutter hangers 20 which act as anchors. An example of an gutter hanger 20 can be seen in FIG. 6.

Generally, the gutter hangers 20 are secured through a fascia board (not shown) which is attached to, and forms a part of building 10. The gutter hanger 20 are securely attached and capable of carrying the weight of the gutter 15, which may not be insubstantial. For example, a typical gutter 15 has a cross section of 3.5 inches by 5 inches. If a twenty foot section is filled with water, this will weigh approximately 150 pounds, while a thirty foot section filled with water will weigh approximately 227 pounds. This could weigh substantially more when laden with ice. Thus, it is a requirement that each gutter hanger 20 be sturdy and reliable when installed.

Figure 3:
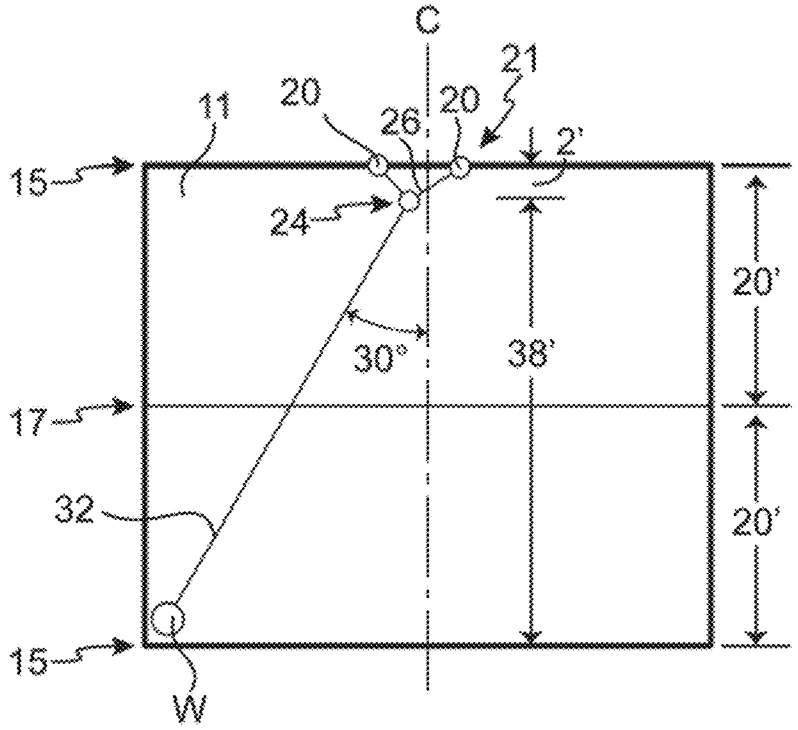
FIG. 3 is a top-down schematic diagram of the residential property of FIG. 1, the diagram depicting aspects of an installation of a fall restraint system according to the teachings herein.
Figure 10:
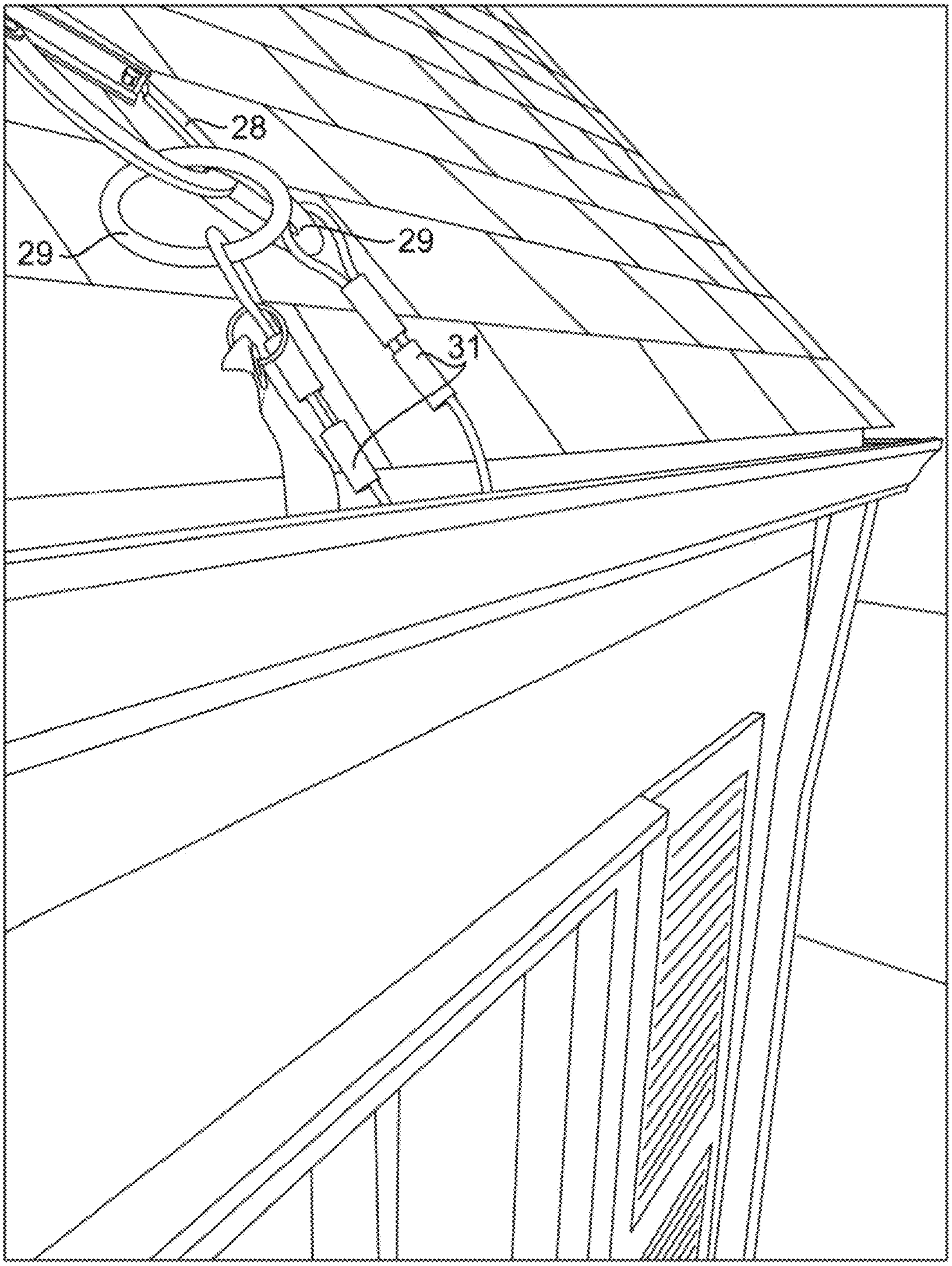
FIGS. 10-12 show the fall restraint system of the claimed disclosure in use on a residential property.
Figure 11:
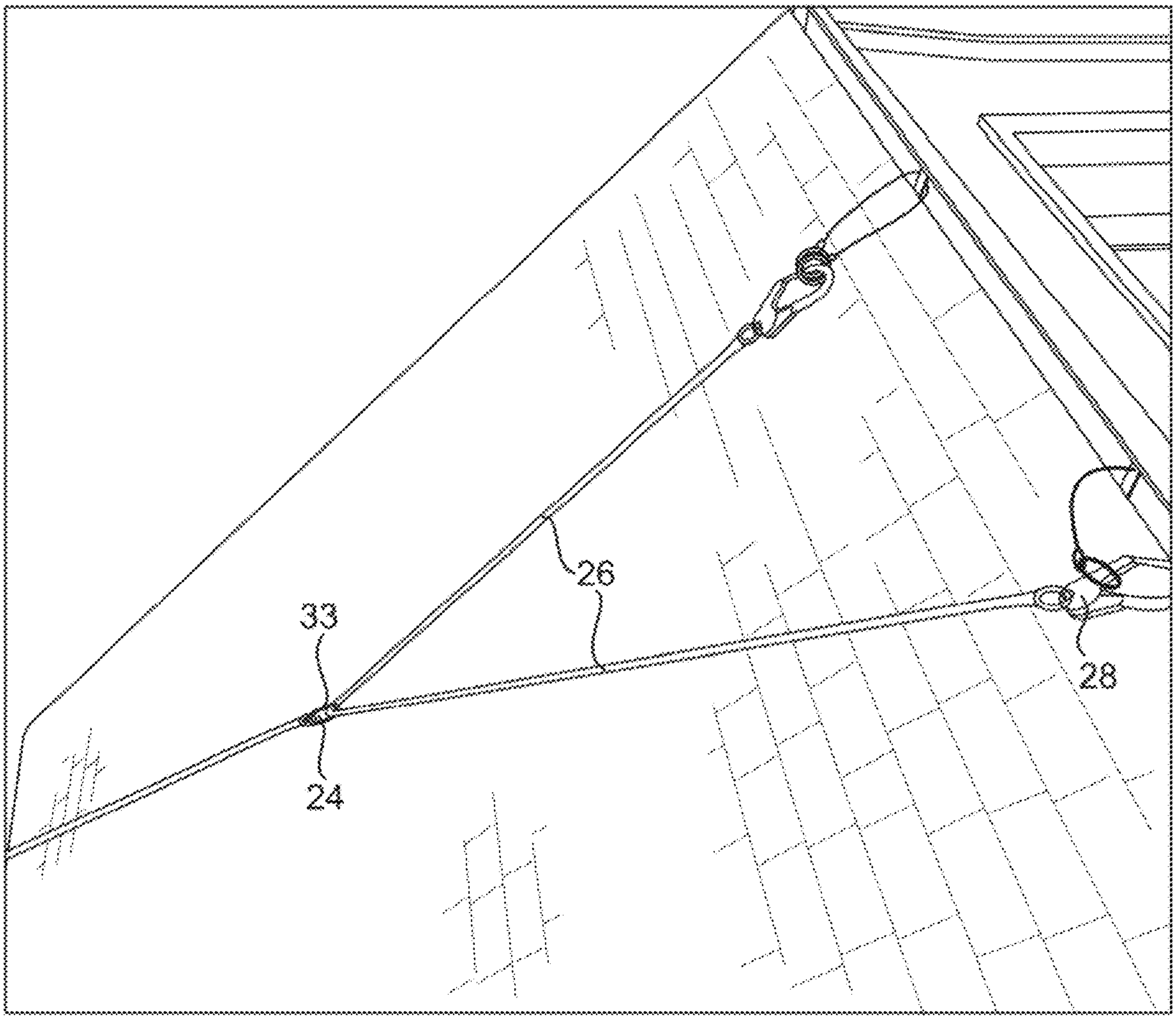
Figure 12:
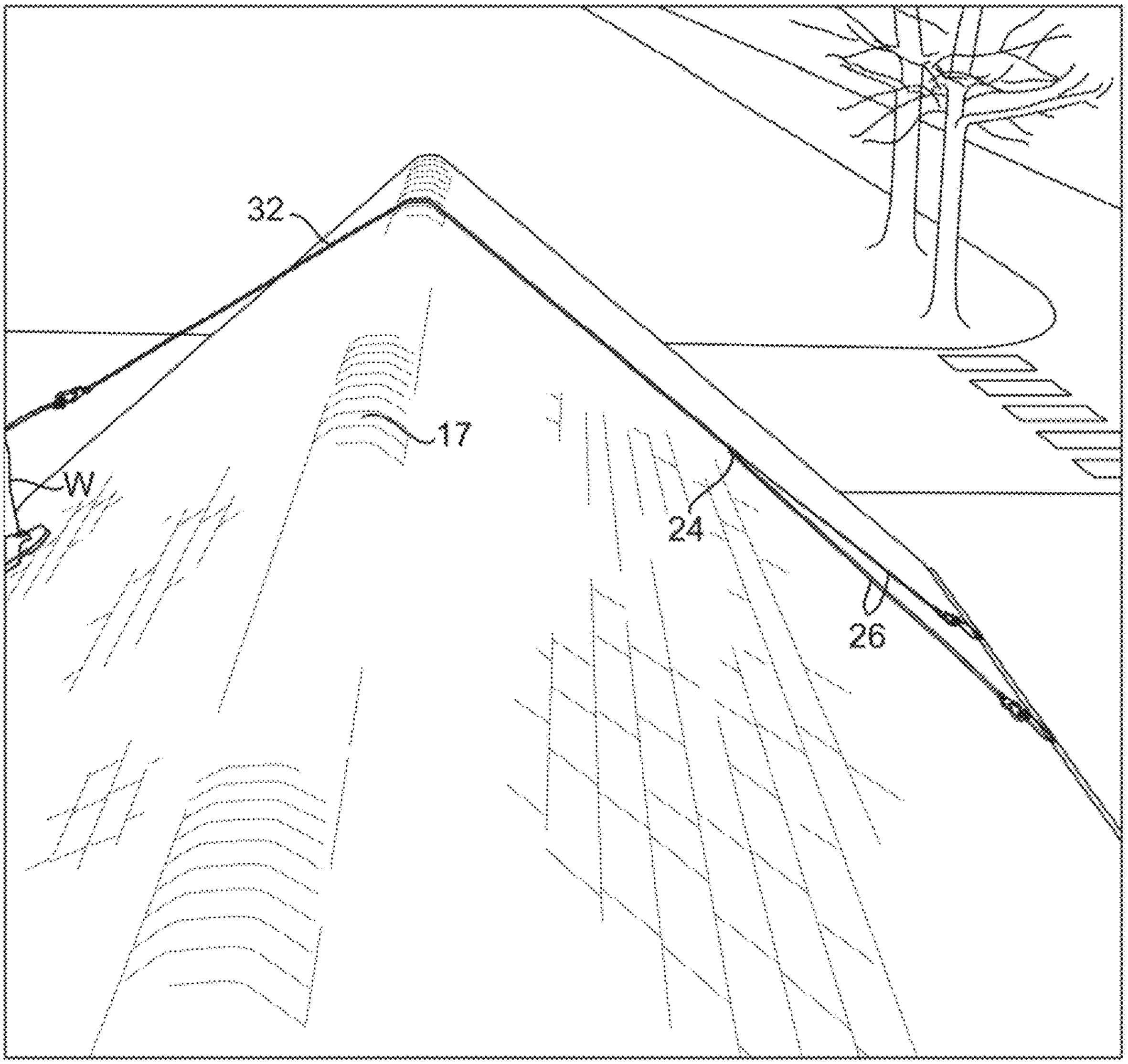

Turning to FIG. 3, an exemplary installation of a system according to the teachings herein is shown. The system includes a yoke line 26 and a support line 32. In a preferred embodiment, the support line 32 is a vertical lifeline. Generally, the yoke line 26 will attach to one or more anchor lines 31 via a clamp 28 attached at the end of the yoke line 26. As seen in FIGS. 10-12, each of the two anchor lines 31 is wrapped around and/or otherwise secured to a gutter hanger 20 and each end of the yoke line 26 is connected to an anchor line 31 via the clamp 28 which is attached to each end of the yoke line 26. Generally, the anchor lines 31 include an additional length of material to provide for some slack between the gutter hangers 20. Preferably, anchors lines 31 can be three-foot, 5/16-inch thick steel vinyl coated cables which contain O-rings 29 to which clamps 28 are attached. Generally, the support line 32 attaches to the yoke line 26, and is preferably slidably connected to the yoke line 26. The support line 32 may travel freely along the yoke line 26. For example, the support line 32 may be attached to the yoke line 26 at yoke point 24 by means of a carabineer or snap hook 33, configured to slide along yoke line 26 without releasing from the same. In a preferred embodiment, clamp 28 can be a rebar hook or a carabineer. Preferably, each anchor line 31 comprises two O-rings 29, one on each end thereof, whereby both O-rings 29 connect to clamp 28 after the anchor line 31 has been wrapped around a gutter hanger 20. This can be seen in FIG. 10. Therefore, in a preferred embodiment, each end of yoke line 26 comprises a clamp 28 which is secured to two O-rings 29, each of which is attached to one end of anchor line 31 which secures to a gutter hanger 20. Stated differently, the preferred embodiment comprises one yoke line 26, two clamps 28, four O-rings 29, and two anchor lines 31. Of course, it is envisioned within the scope of the disclosure that different amounts of clamps 28, O-rings 29, or anchor lines 31 could be utilized.

Once installed, the support line 32 is placed over the ridge 17 of the roof 11. At the opposing end of the support line 32, the worker W is provided with a coupling for coupling a conventional harness, such as the LITEFIT Positioning Harness, Tongue Buckle Legs (M/L). Once properly configured, the worker W may freely move about the side of the roof 11 that opposes the connection side where the gutter hangers 20 reside.

FIG. 3 shows an example of a basic layout of a typical pitched roof with the fall restraint system in place. In the example shown, the footprint of the house is symmetric at 20 feet on each side of the ridge 17. Two attachment points 21 along the gutter on one side of the house are shown and joined at a point known here simply as the "yoke" 24, whereby yoke 24 is the point at which yoke line 26 connects along the roof to support line 32, preferably by means of carabineer or snap hook 33. The yoke line 26 is attached at both ends to respective attachment points 21 on gutter 15 (preferably by means of anchor lines 31, O-rings 29, and clamp 28). In this example, the yoke 24 is located approximately six to eight feet up the roof from one eave/gutter 15 with the attachment points 21 (and thus thirty-eight feet up the roof from the other gutter 15). In a preferred, non-limiting embodiment, the yoke line 26 is a 15-foot, 5/8 inch polyester/polypropylene blend rope with two rebar hook ends. In the example seen in FIG. 3, the support line 32 is shown at 30 degrees of arc from the center axis C of roof 11. In a preferred, embodiment, the support line 32 is a 50-foot, 5/8 inch polyester/polypropylene blend rope, and preferably has a manual rope adjustor with 18" lanyard restraint secured to a harness buckle.

Figure 4:
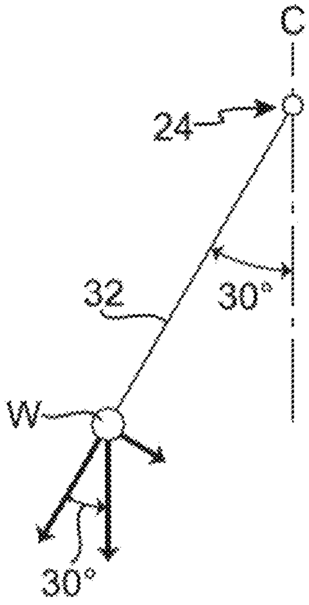
FIG. 4 is a vector diagram depicting aspects of geometry and forces applied in the system of FIG. 3.

FIG. 4 is a schematic representation of the force vectors that may result from the initiation of a slippage incident, i.e., an occurrence in which the worker W starts to slip or slide across the surface of the roof 11 due to gravity, to prevent the worker W from falling and maintain safety and positioning as a result of the present disclosure fall restraint system. The present disclosure fall restraint system is designed to utilize multiple points of contact with a roof 11 to reduce tension in the rope support for a worker W and thereby stabilize the worker W in case of a slipping, tripping, or falling incident, and reduce the risk of the support failing to hold the worker's body weight. To do this, the present disclosure utilizes multiple attachment points 21 on the gutter hangers 20 of a gutter 15, to which anchor lines 31 are connected, and a yoke 24 which joins an initial rope segment (yoke line 26, which is connected on each end to anchor lines 31), and transfers tension to a new rope (support line 32), which then crosses and leans on ridge 17 of roof 11 before eventually connecting to worker W. Through all of this, the tension in support line 32 is designed to be lower than the direct force of weight plus momentum.

Specifically, for the example shown in FIG. 4, where a worker is at a 30 degree angle off of center axis C from the yoke position, the tension is proportional to the cosine of 30 degrees, or approximately 87% of the tension of the same support line 32 in a slippage or tripping incident had the worker W been at a center axis C position aligned across the roof 11 with the yoke 24. Through the configuration of the present disclosure, the tension percentage is designed to decrease proportionally as the angle of the worker W off of the center axis C, and continues to decrease as the angle increases. Note that the forces shown in FIG. 4 only come in to existence if and when a worker W starts in motion as would happen if a slippage incident is initiated and the rope is being used as a restraint. In a preferred embodiment, the angle from center axis C is between 0 and 41 degrees.

Figure 5:
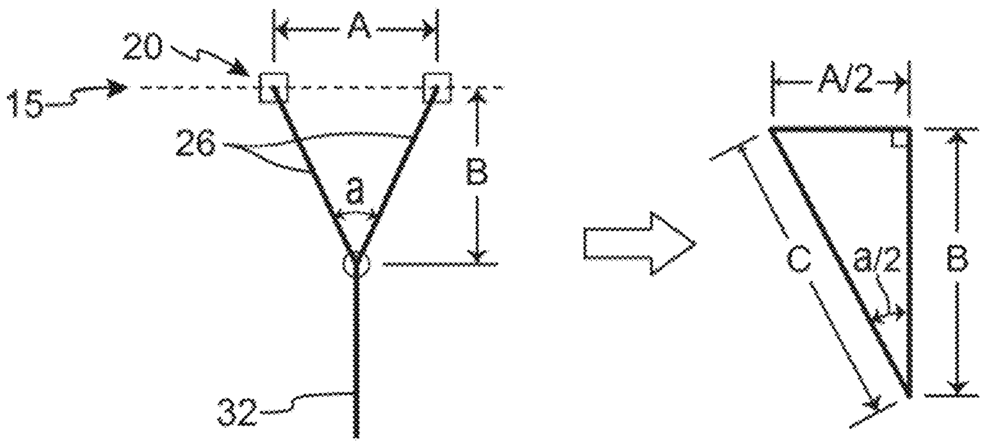
FIG. 5 is a diagram depicting aspects of geometry and forces applied in the system of FIGS. 3 and 4.
Figure 7:
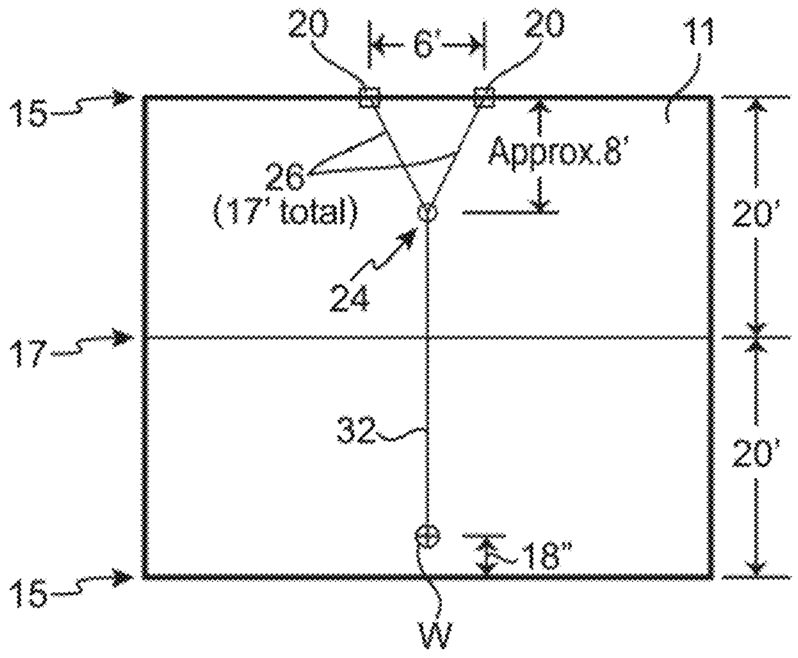
FIG. 7 is top-down schematic diagrams of the residential property of FIG. 1, the diagram depicting aspects of an installation of a fall restraint system according to the teachings herein, with worker at center position with respect to the fall restraint system.
Figure 8:
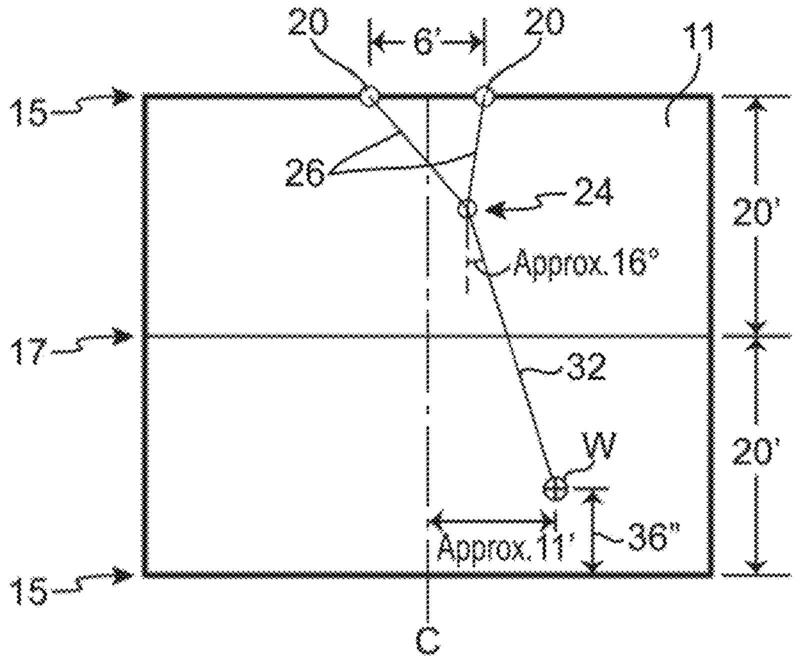
FIG. 8 is top-down schematic diagrams of the residential property of FIG. 1, the diagram depicting aspects of an installation of a fall restraint system according to the teachings herein, with worker at an extended lateral position with respect to the fall restraint system.

FIGS. 5, 7, and 8 are diagrams depicting aspects of geometry and force vectors, showing preferred embodiments of the disclosure whereby the support line 32 is designed to hold a worker W at an angle from center axis C, which is aligned with yoke 24 along the roof 11. FIG. 7 is diagram of a typical roof layout with the worker W at a center axis C on roof 11 with respect to yoke 24. The example in FIG. 7 provides a plan view of pitched roof 11 showing worker W along center axis C and aligned with yoke 24, with a center of gravity that is eighteen inches from the edge. FIG. 8 is a diagram of a typical roof layout with the worker W at a laterally extended work position on roof 11 with respect to yoke 24, with a center of gravity that is thirty-six inches from the edge. This indicates an 18-inch working range up and down the roof (18 to 36 inches), and a 22-foot horizontal range (e.g., up to 11 feet laterally on either side of the center axis C). The examples shown in FIGS. 7-8 are only exemplary, and actual horizontal extension will depend on actual roof dimensions and pitch.

These and other aspects are evaluated when considering loading and capabilities of the fall restraint system disclosed herein. These aspects are discussed further with regard to FIG. 9, in which a flow chart depicting an exemplary method for set-up and use of the fall restraint system is provided.

Figure 9:
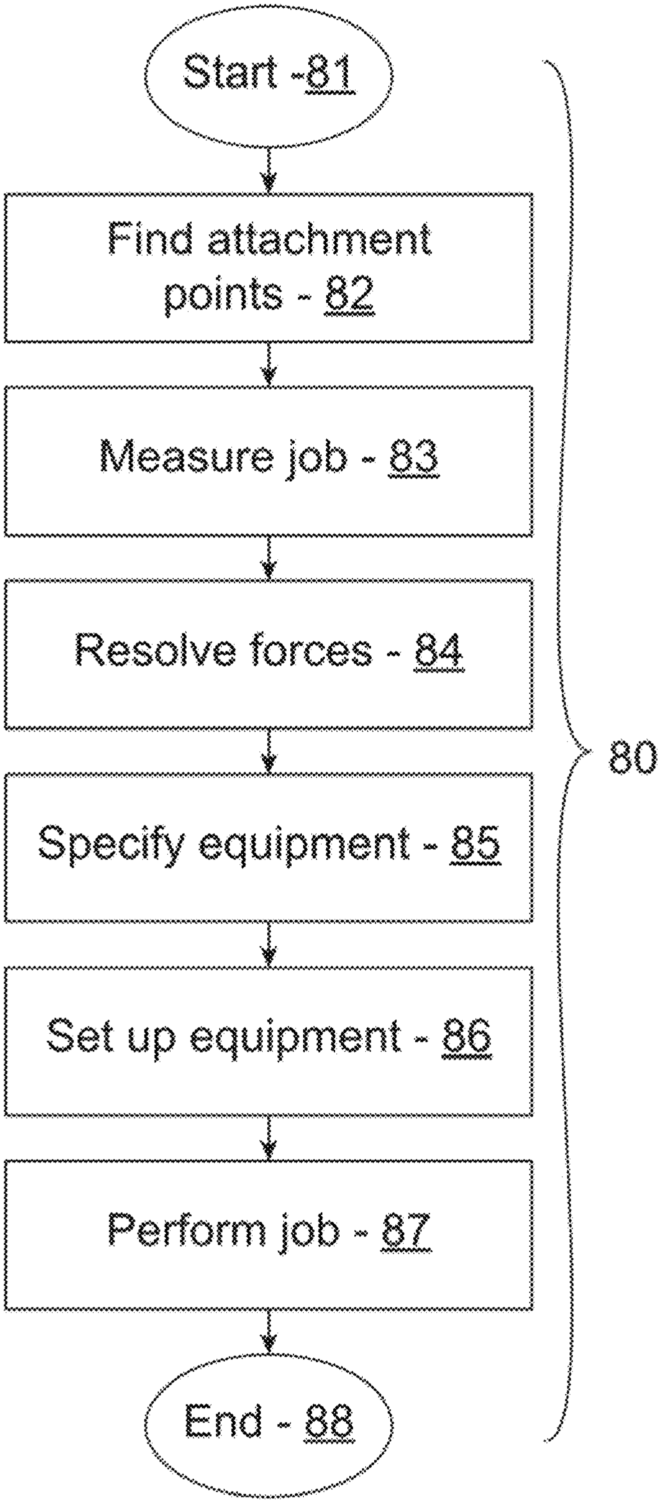
FIG. 9 is a flow chart depicting an exemplary method for implementation of the system disclosed herein.

As seen in FIG. 9, a process for employing the fall restraint system 80 of the present disclosure is provided, starting at a job site 81. Once at the job site, the worker W finds potential attachment points 82 on the roof 11. While the attachment points may be gutter hangers 20, and typically are, other features of the building 10 may be used.

Once the worker W finds potential attachment points 82, several optional measurements can be taken: the distance between the attachment points 82, the dimensions of the roof 11, and a zone within which the worker W shall be working, preferably across the ridge 17 on the roof 11. Additionally, inspection of the attachment points 82 is preferably performed, and appropriate documentation, such as safety forms, are provided. The dimensional information (such as those depicted in FIGS. 3-5), along with other aspects such as a weight of the worker W, may be used to resolve forces 84 and perform loading calculations. Generally, the loading calculations evaluate the aspects input and derive force vectors, which may then be used to specify equipment 85 by identifying any limitations or additional requirements for the fall restraint system to support worker W at the particular angles off of center axis C that he/she may be working. Once the equipment for the particular installation of fall restraint system equipment has been specified, the worker W will set up the fall restraint system equipment 86 and then perform the job 87. Once the work is completed, the fall restraint system equipment is removed and the process ends 88. It is envisioned within the scope of the present disclosure that the order of steps presented in FIG. 9 could be accomplished in alternate orders.

FIGS. 10-12 show exemplary images of the fall restraint system of the present disclosure in practice on a roof 11, showing anchor lines 31 wrapped around gutter hangers 20, and connected on both ends to clamps 28 by means of O-rings 29. Clamps 28 are in turn attached to yoke line 26 and then to support line 32 at yoke 24 by means of carabineer or snap hook 33. From yoke 24, support line 32 extends over ridge 17 and to worker W.

In another embodiment, a measurement, system may be used in conjunction with the software system, and implemented with a computer outfitted with a camera. For example, a smartphone may implement an application (an "app") that receives images from an on board camera and calculates distances according to known features (such as, for example, a width of a clapboard, a brick size, a known standard or some other similar feature). The computer may generate a report with appropriate detail needed for the various interested parties. For example, reports may include: specifications for the fall restraint system specified for a particular work-site; excerpts of applicable regulations; a customer report; a supervisor report; a compliance report; an insurer report and other types of reports. The system may be interactive, and include, for example, a statement for worker acknowledgement of system design and limitations. In some embodiments, the measurement system can be provided as a tablet computer in which the user inputs measurements manually. In some other embodiments, the measurement system can include specialized components, such as an integrated laser measurement tool and/or a sonic measurement tool in communication with the tablet computer through a wireless link. In some embodiments, the measurement system can be used with a computer system that provides an accessory to the fall restraint system. The accessory enables workers to check off procedure lists and enables reporting from the field via satellite, cell tower networks, and the like. In short, the accessory enables compliance with safety procedures, training, reporting and enforcement.

A safety performance management system described herein provides the ability to track, monitor, evaluate, and implement compliance with safety regulations prescribed for a given work site. The system facilitates and automates data gathering and timely completion of compliance records. The system herein may enhance personnel accountability by requiring digital completion of tasks defined by the safety performance management system prior to work site commencement and/or performance, whether or not the responses are compliant.

The system may also aggregate the gathered data from work sites, workers, and foremen and create performance profiles for same. The system may provide real-time reporting, alert notification, and centralized analysis tools, thereby enabling management to track compliance with various requirements across the work sites. By collecting safety performance of workers in the field through a series of scores assigned to a variety of itemized requirements, and an opportunity to input findings during inspections, which can be stored for future use and tracked via reporting, a supervisor can be alerted if safety performance is not adhered to as prescribed. It is also envisioned that the software program could identify workers checked into a job site through electronic signature verification, and record any commendations or discipline issues as a result of the checks. This information is gathered and stored for future use and to track success and failures of crews.

Figure 13:
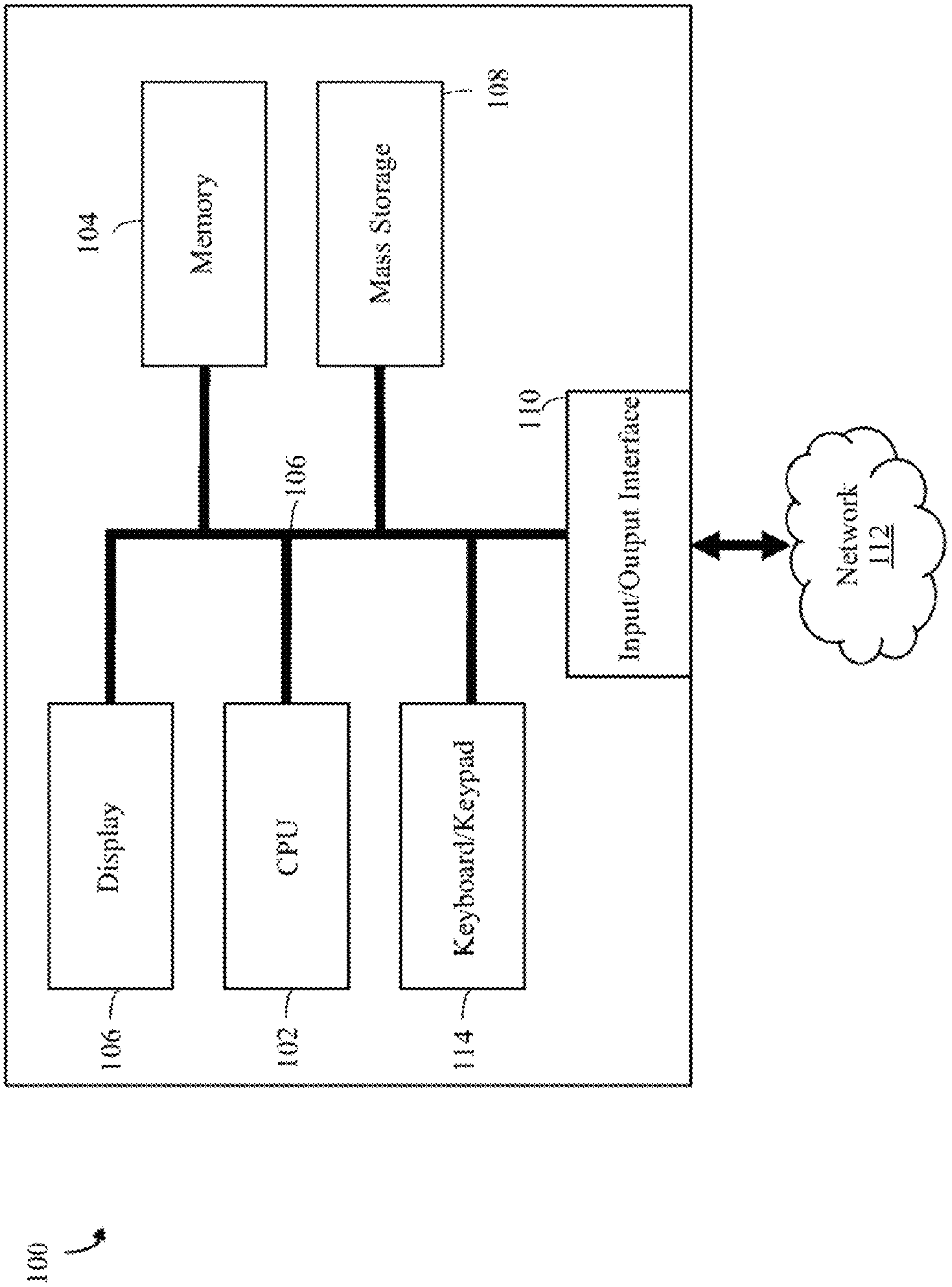
Figure 14:
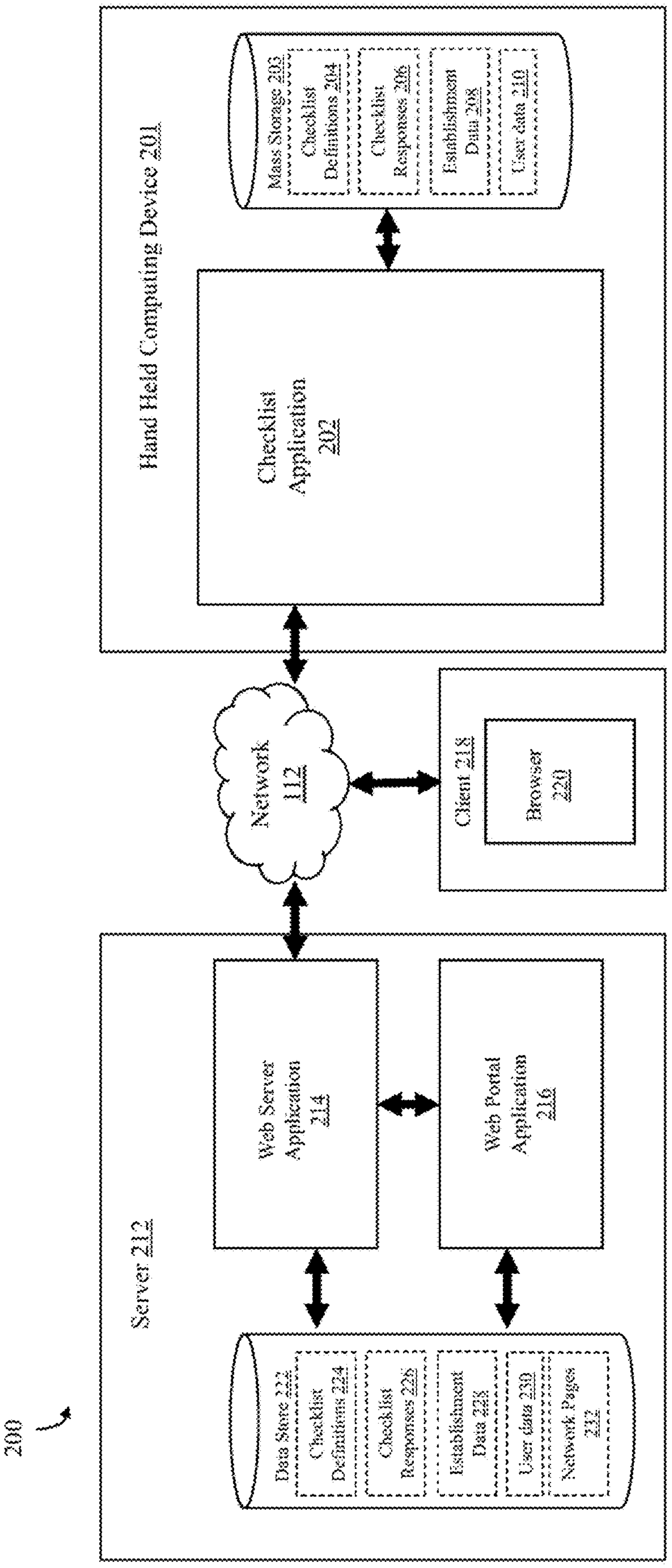
FIG. 14 is a schematic diagram of a system for evaluating and enforcing safety performance at a work site.

With reference to FIGS. 13 and 14, shown are illustrations of systems 100, 200 arranged to perform processing associated with a handheld computing device 201, server 212, computer, or the like. The exemplary computer system 100 includes a central processing unit (CPU) 102, a memory 104, and an interconnect bus 106. The CPU 102 may include a single microprocessor or a plurality of microprocessors or special purpose processors for configuring computer system 100 as a multi-processor system. The memory 104 illustratively includes a main memory and a read only memory. The computer 100 also includes the mass storage device 108 having, for example, various disk drives, tape drives, etc. The memory 104 also includes dynamic random access memory (DRAM) and high-speed cache memory. In operation, memory 104 stores at least portions of instructions and data for execution by the CPU 102. The memory 104 may also contain compute elements, such as Deep in-Memory Architectures (DIMA), wherein data is sent to memory and a function of the data (e.g., matrix vector multiplication) is read out by the CPU 102.

The mass storage 108 may include one or more magnetic disk, optical disk drives, and/or solid state memories, for storing data and instructions for use by the CPU 102. At least one component of the mass storage system 108, preferably in the form of a non-volatile disk drive, solid state, or tape drive, stores the database used for processing data and controlling functions of a computer system 100 in the form of a handheld computing device. The mass storage system 108 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 100.

The computer system 100 may also include one or more input/output interfaces for communications, shown by way of example, as interface 110 and/or a transceiver for data communications via the network 112. The data interface 110 may be a modem, an Ethernet card, or any other suitable data communications device. To provide the functions of a processor according to FIG. 13, the data interface 110 may provide a relatively high-speed link to a network 112, such as an intranet, internet, Aegis network, or the Internet, either directly or through another external interface. The communication link to the network 112 may be, for example, optical, wired, or wireless (e.g., via satellite or cellular network). The computer system 100 may also connect via the data interface 110 and network 112 to at least one other computer system to perform remote or distributed multi-sensor processing related to, for example, a common operational picture (COP). Alternatively, the computer system 100 may include a mainframe or other type of host computer system capable of Web-based communications via the network 112, The computer system 100 may include software for operating a network application such as a web server and/or web client.

The computer system 100 may also include suitable input/output ports, that may interface with a portable data storage device, or use the interconnect bus 106 for interconnection with a local display 106 and keyboard 114 or the like serving as a local user interface for programming and/or data retrieval purposes. As mentioned prior, the display 106 may include a touch screen capability to enable users to interface with the system 100 by touching portions of the surface of the display 106. Server operations personnel may interact with the system 100 for controlling and/or programming tie system from remote terminal devices via the network 112.

The computer system 100 may run a variety of application programs and store associated data in a database of mass storage system 108. One or more such applications may include a checklist application 202, a web server application 214, or a web portal application 216, such as described with respect to FIG. 14.

The components contained in the computer system 100 may enable the computer system to be used as a server, workstation, personal computer, network terminal, mobile computing device, mobile telephone, System on a Chip (SoC), and the like. The system 100 may include software and/or hardware that implements the web server application 214. The web server application 214 may include software such as HTML, XML, WML, SGML, PHP (Hypertext Preprocessor), CGI, and like languages.

The foregoing features of the disclosure may be realized as a software component operating in the system 100 where the system 100 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on. The system 100 may use a digital signal processor (DSP).

As stated previously, the mass storage 108 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 100 may include a database that is integrated with computer system 100, however, it will be understood that, in other implementations, the database and mass storage 108 can be an external element.

In certain implementations, the system 100 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the computer system 100 includes a network-based, e.g., Internet-based, application that may be configured and run on the system 100 and/or any combination of the other components of the computer system 100. The computer system 100 may include a web server running a Web 2.0 application, Web 3.0 application, or the like. Web applications running on the computer system 100 may use server-side dynamic content generation mechanisms such, without limitation, Java servlets, CGI, PHP, or ASP. In certain implementations, mashed content may be generated by a web browser running, for example, client-side scripting including, without limitation, JavaScript and/or applets on a wireless device.

In certain implementations, the computer system 100 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting. e.g., JavaScript. Certain web-based applications and services may utilize web protocols including, without limitation, the services-orientated access protocol (SOAP) and representational state transfer (REST). REST may utilize HTTP with XML.

The computer system 100 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

Referring now specifically to FIG. 14, an example system for evaluating and enforcing safety performance 200 at a work site is shown. A hand held computing device 201 is configured to execute various applications such as, for example a checklist application 202 and other applications. As mentioned prior, the mass storage 203 of the hand held computing device 201 may be used to store data including checklist definitions 204, checklist responses 206, establishment data 208, user data 210, and potentially other data. Checklist definitions 204 include definitions of checklists to be performed by a service technician at a work site. Checklist responses 206 include the responses of the service technician to the checklist when the checklist is performed. Establishment data 208 includes other data relating to a specific work site. User data 210 includes configuration settings for various users of the hand held computing device 201 such as, for example, language preferences, biometric data, etc.

A server 212 is configured to execute various applications such as, for example, a web server application 214, a web portal application 216, and other applications. The web server application 214 is configured to serve up network pages such as, for example, web pages to clients 218 over the network 112. The web server application 214 may use a protocol such as, for example, hypertext transfer protocol (HTTP), user datagram protocol (UDP), etc. The web portal application 216 is configured to generate network pages functioning as an administration and monitoring interface for a work site. To this end, the web portal application 216 may be a standalone application working in conjunction with the web server application 214 or may include a plurality of server-side scripts executed in response to user requests by the web server application 214.

The server 212 also includes a data store 222 and potentially other data stores, which may include data and applications operable to provide access to the data. The data store 222 may be used to store data including checklist definitions 224, checklist responses 226, establishment data 228, user data 230, network pages 232, and potentially other data. Checklist definitions 224 include definitions for checklists to be completed by a service technician at a work site. Checklist responses 226 include the responses of the service technician to the checklist when the checklist is performed. Establishment data 228 includes other data relating to a specific work site. User data 230 includes privileges and preferences for the management users of the web portal application 224. Network pages 232 include all static and dynamic network pages used by the web portal application 216 and served up by the web server application 214.

The client 218 may be configured to execute various applications such as a browser 220 and/or other applications. The browser 220 may be executed in a client 218, for example, to access and render network pages, such as web pages, or other network content served up by the server 212 and/or other servers.

Figure 15:
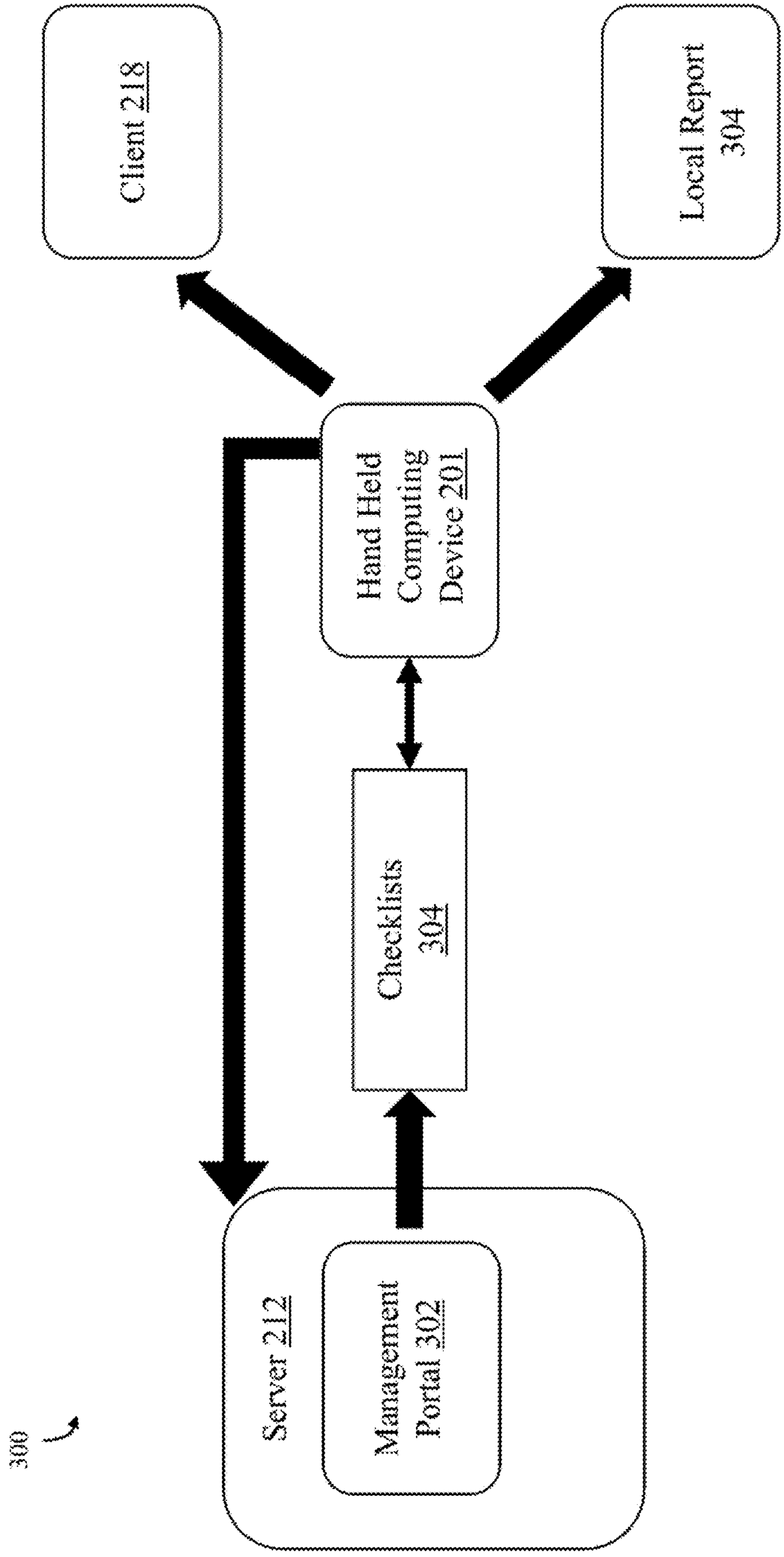
FIG. 15 shows a schematic diagram of operation of the system of FIG. 14, specifically an operation for generating, modifying, and distributing checklists and reports.

Referring now to FIG. 15, illustrated is an embodiment for generating, modifying, and distributing checklists 300 as an operation of the system for evaluating and enforcing safety performance 200. A management user may access a management portal 302 through the web portal application 216. In some embodiments, the management portal 302 is the same application as the web portal application 216 but with behavior specific to management users, configured in user data 230. Through the management portal 302, the management user is able to configure checklists 304 for both service technicians and safety inspectors performing safety analyses at one or more work sites. Service technicians may access uniquely tailored checklists 304 specific to their role via a hand held computing device 201 while on the job. Similarly, safety inspectors may access uniquely tailored checklists 304 specific to their role via the hand held computing device 201 while on the job. Users of the hand held computing device 201 may further configure the checklists 304 while on the job. For example, a safety inspector might decide to change a particular task or configure settings pertaining to the checklists 304 accessed by service technicians using the hand held computing device 201.

Once complete, the hand held computing device 201 can transmit checklist responses 206 through the checklist application 202, over the network 112. As such, the server 212 or hand held computing device 201 generates a network page summarizing the responses to the checklist for the work site. The network page can be transmitted to a client 218 capable of generating a report for the work site including a safety report or back to the server 212 for storage. The summary of the responses to the checklist can also be output locally 304 on the hand held computing device 201.

Referring back to FIGS. 13 and 14, after being generated, and in some cases customized, a checklist is sent from the web portal application 216 on the server 212 to the checklist application 202 on the handheld computing device 201 at the respective work site by way of the network 112. The checklist distribution may be performed either in a push or pull configuration. For example, the checklist application 202 may poll the server 212 for an updated checklist at regular intervals or when other data is being sent to the server 212. Alternatively, the checklist application 202 may receive an updated checklist from the server 212 automatically after the updated checklist is generated.

Figure 16B:
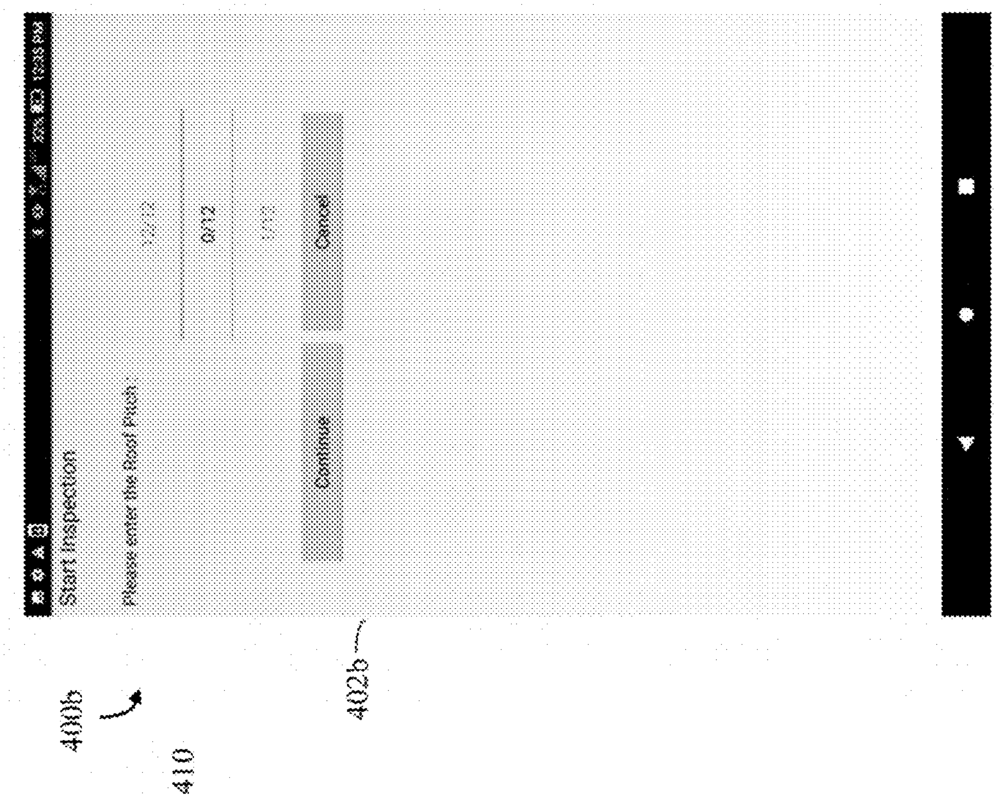
FIGS. 16A-16B are examples of service technician user interface screens displayed according to various embodiments of the handheld computing device of FIG. 14.
Figure 16A:
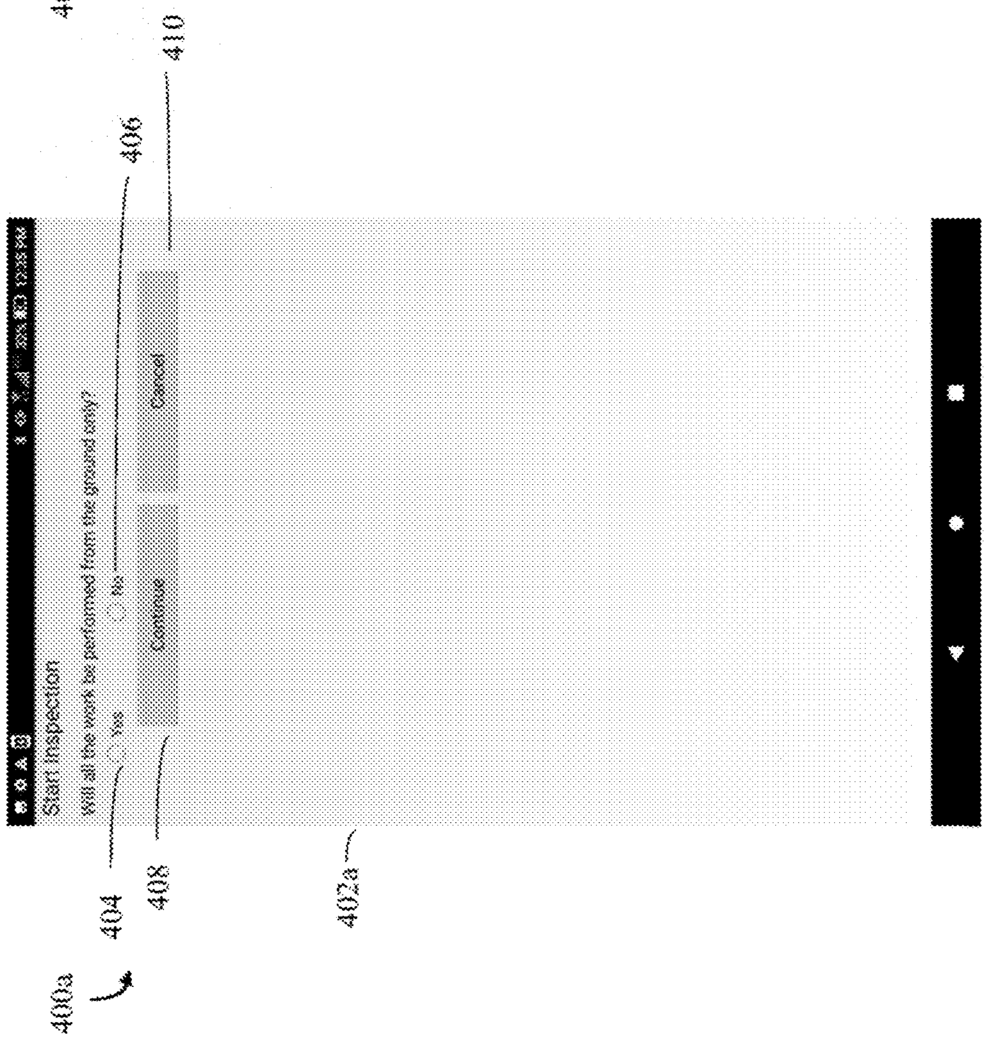

Referring now to FIGS. 16A-16B, shown are examples of service technician user interface screens 400*a*, 400*b* displayed on display 106 according to various embodiments of the handheld computing device 201. The user interface screens 400*a*, 400*b* are derived from the checklist application 202 and thus prompts a user to respond to a checklist 304 defined by checklist definitions 204 stored on the hand held computing device 201. To begin, a service technician begins interacting with the checklist application 202 on the handheld computing device 201. FIG. 16A depicts one example of a task screen 402*a* displayed by the display 106. As a non-limiting example, the task screen 402*a* prompts the service technician with a yes/no completion-oriented task. Thus, after the task has been successfully performed, the user is to select the yes circle 404. If the task could not be successfully performed, the user is to select the no circle 406. The service technician may then proceed to a subsequent prompt by selection of the continue button 408 or cancel the safety performance analysis via the cancel button 410.

FIG. 16B shows a task screen 402*b* requiring data entry displayed by the display 106. Task screen 402*b* is an example of how input may be gathered manually from a user. In this non-limiting example, task screen 402*b* prompts a service technician with a numerical data entry task: entering the roof pitch of a work site via scrolling through several viable options. It should be appreciated that a key pad maybe be employed with user input buttons in order to enter the roof pitch or other relevant data. In other embodiments, particularly for non-numeric data entry, other configurations of graphical user interface elements may be employed to facilitate manual data entry on display 106.

Task screens 402*a*, 402*b* show exemplary safety performance tasks. It should be appreciated that the checklist application 202 via the handheld computing device 201 may also prompt a service technician with confirmation or lack thereof that the service technician has inspected the job site and has confirmed that (1) there are no ground hazards present; (2) there are no weather hazards presents; or (3) there are no other hazards present that make the job dangerous at ground level. Similarly, the checklist application 202 via the handheld computing device 201 may also prompt a service technician with confirmation or lack thereof that the service technician has inspected the job site and has confirmed that (1) there are no hazards on the roof including electrical hazards, environmental hazards, or weather hazards either existing or potential; or (2) there are no hazards of the condition of the roof including the presence of ice, snow, frost, moss, loose shingles, or other factors that could affect traction in the areas work is to be performed.

Likewise, it is envisioned that the checklist application 202 via the handheld computing device 201 may also prompt a service technician with confirmation or lack thereof that all work will be performed from the ground only. If the service technician selects via the task screen 402*a*, 402*b*, that all work will not be performed from the ground only, the service technician may be prompted with a several options as to which fall protection method(s) will be used to perform the service, such as (1) use of gutter hangers as anchors; (2) use of alternative anchors such as chimneys, deck posts, trees, or vehicles; (3) use of a ladder; or (4) none of the fall protection methods listed above. If the prompt for none of the fall protection methods listed above is selected, the checklist application 202 may prompt the service technician to document the reasons why use of gutter hangers as anchors and/or alternative anchors are not being used. The service technician may thereafter select that (1) there were no available alternative anchors opposite to the work area; (2) hangers cannot be used; (3) hanger or fascia are damaged or not visually strong; (4) the chimney cannot be used; or (5) another reason, thereby triggering a comment box to appear on the display 106.

By the same virtue, the service technician may confirm or deny that they need to walk on the roof without using any fall protection methods. Thereafter, the checklist application 202 may prompt the technician to confirm or deny if the roof pitch rises 4 inches for every 12 horizontal inches, forming roughly an 18.5 degree angle between a horizontal section and the roof slope, which may present a safety hazard.

Figure 17A:
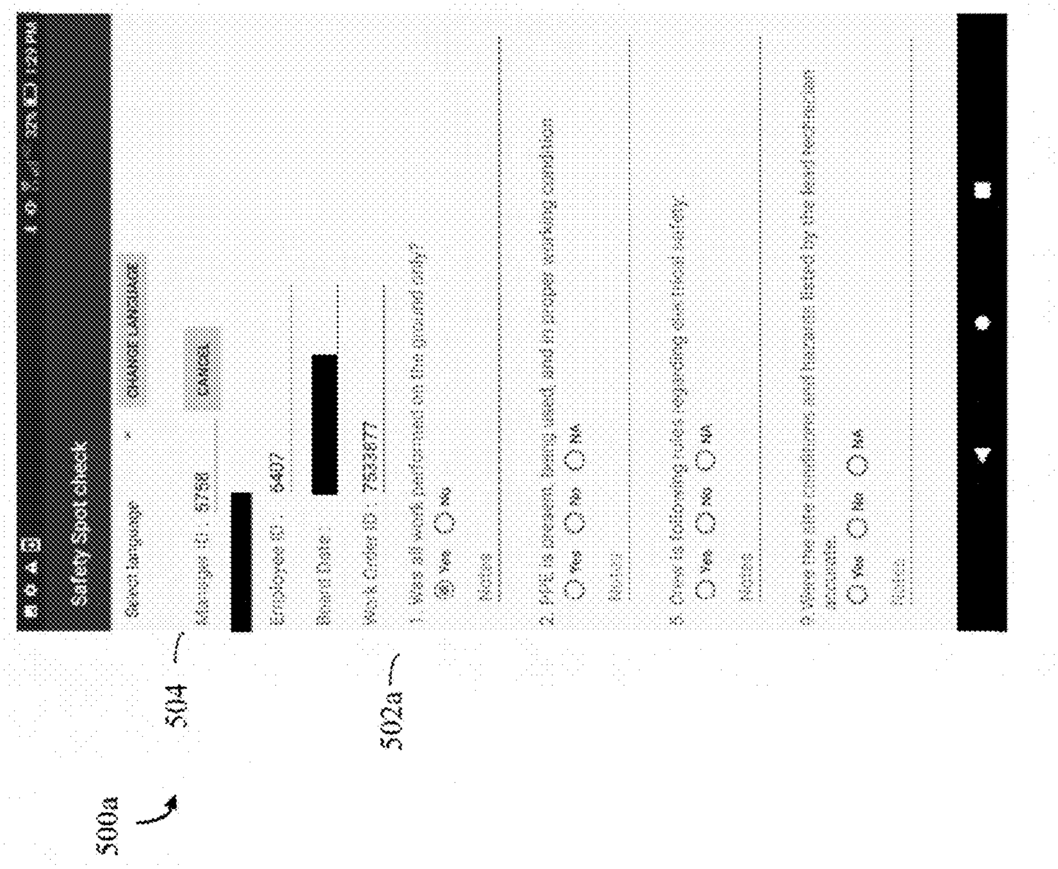
FIGS. 17A-17B are examples of safety inspector user interface screens displayed according to various embodiments of the handheld computing device of FIG. 14.
Figure 17B:
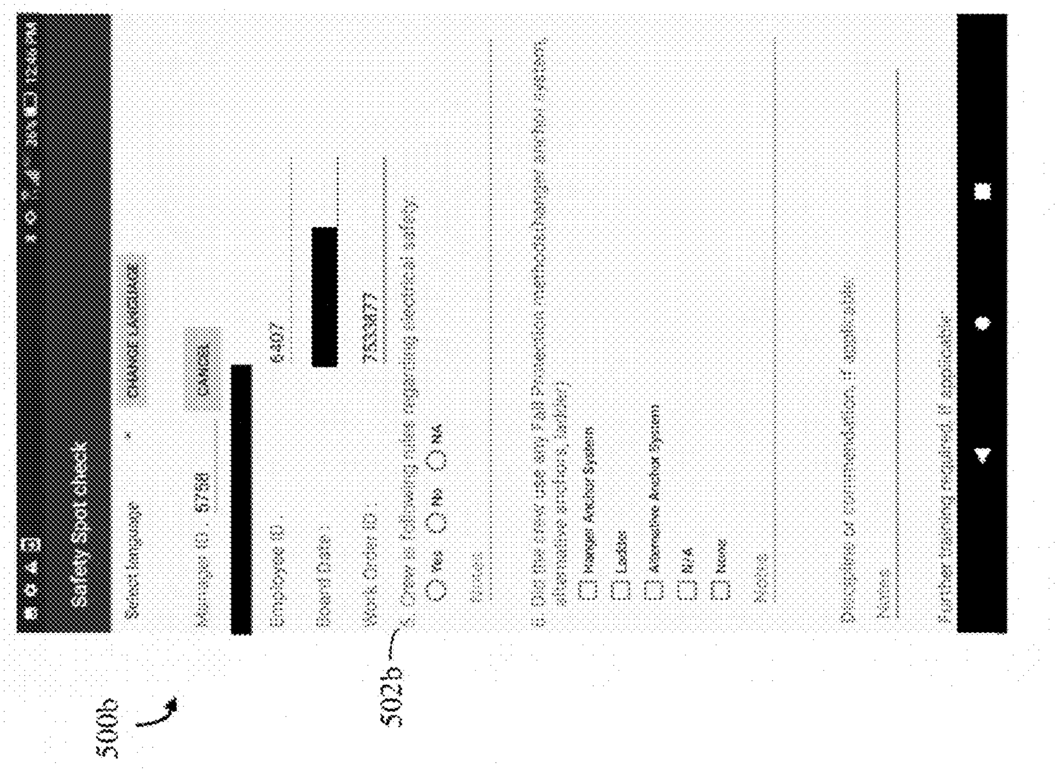

Turning now to FIGS. 17A-17B, non-limiting examples of a safety inspector user interface screen 500*a*, 500*b* displayed on display 106 according to various embodiments of the handheld computing device 201. The user interface screens 500*a*, 500*b* are derived from the checklist application 202 and thus prompts a user to respond to a checklist 304 defined by checklist definitions 204 stored on the hand held computing device 201. As with the service technician user interface screens 400*a*, 400*b* of FIGS. 16A-16B, a safety inspector begins interacting with the checklist application 202 on the handheld computing device 201. FIG. 16A depicts one example of a task screen 502*a* displayed by the display 106. The safety inspector may be prompted to input a manager identification number, their name, an employee identification number, the date, and a work order Identification number in a bibliographic portion 504 of the task screen 502*a*.

As a non-limiting example, the task screen 502*a* prompts the safety inspector with several yes/no completion-oriented tasks. In this example, the safety inspector is asked to verify if (1) all work was performed on the ground only; (2) if personal protection equipment (PPE) is present, being used, and in proper working condition; (3) if the service technicians and crew are following rules regarding electrical safety; and (4) if the site conditions and hazards listed by the lead service technician are accurate. One or more of the above mentioned questions may disappear or may not be asked of the safety inspector depending on their responses.

FIG. 17B shows a further tasks screen 502*b* continuing from task screen 502*a*. Task screen 502*b* prompts the safety inspector with a check-all-that-apply inquiry questioning if the crew used any fall protection methods (hanger anchor system, alternative anchors, or ladder). Additionally, the safety inspector is asked to enter comments regarding discipline, commendation, and if further training is required of the service technicians evaluated.

Task screens 502*a*, 502*b* show exemplary safety inspection tasks. It should be appreciated that the checklist application 202 via the handheld computing device 201 may also prompt a safety inspector with confirmation or lack thereof that the safety inspector has inspected the job site and has confirmed that (1) ladders are in proper working condition; (2) the service technician crew is following rules regarding ladder use including positioning and procedures; (3) forms were filled out accurately; (4) the site was suitable for the fall protection method chosen by the service technician crew; (5) the lead service technician made the appropriate selection as to the roof pitch, roof surface, fascia, gutter hangers and fasteners; (6) the service technician crew used the selected safety method safely; and (7) the service technician crew used safety monitoring correctly.

With reference again to FIG. 14, after the service technician or safety inspector has completed the tasks of their respective checklist 304, or at least has attempted to complete the checklist 304, the checklist responses 206 stored on the handheld computing device 201 are sent to the server 212 to be stored in checklist responses 226. The sending of the checklist responses 206 may be automatic, or it may be manually triggered. As a non-limiting example, the user may indicate on the handheld computing device 201 that the checklist 304 has been completed and should be sent to the server 212.

Figure 18:
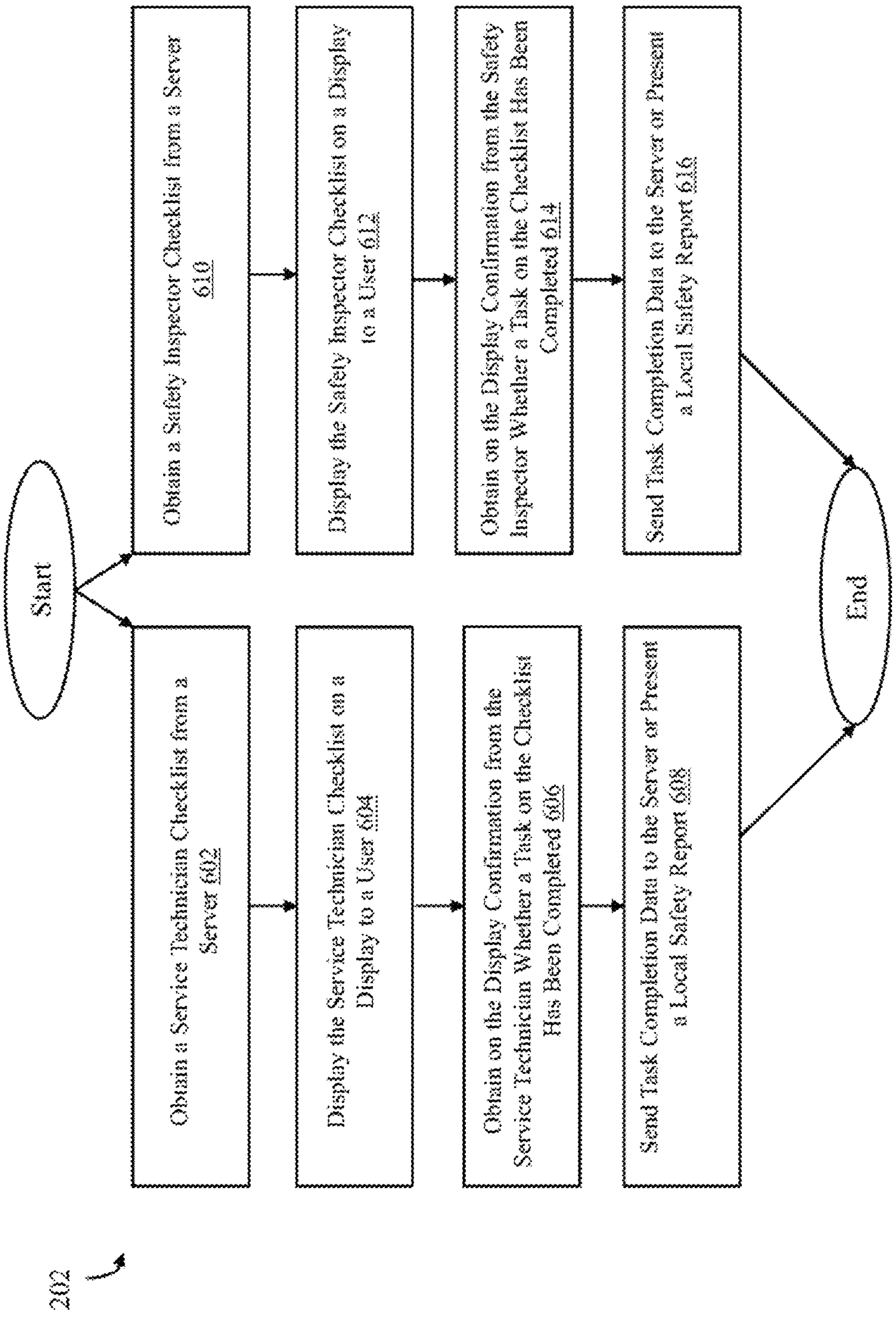
FIG. 18 shows a block diagram illustrating an example of the operation of the checklist application according to various embodiments of the handheld computing device of FIG. 14.

Turning now to FIG. 18, shown is a flowchart that provides one example of the operation of the checklist application 202 according to various embodiments. It is understood that the flowchart of FIG. 18 provides merely an example of the many different types of functional arrangements that may be employed to implement the operation of the checklist application 202 as described herein. As an alternative, the flowchart of FIG. 18 may be viewed as depicting an example of steps of a method implemented in the handheld computing device 201 according to one or more embodiments. Initially, the checklist application 202 is started and proceeds on two parallel paths in this embodiment. Additional parallel paths are also possible.

At box 602, the checklist application 202 obtains a checklist 304 from the server 212 for a user such as a service technician at a work site. Alternatively, the checklist application 202 may obtain the checklist 304 saved locally. The checklist 304 may include a plurality of safety performance tasks to be performed at the work site. The checklist 304 may be stored in the checklist definitions 204 within the mass storage 203 of the handheld computing device 201. In box 604, the checklist 304 is displayed by the checklist application 202 on a display 106 of the handheld computing device 201 to the user. The display may be in response to some input provided by the user on the display 106 or may be performed automatically.

In box 604, the checklist application 202 obtains, by way of the display 106, confirmation from the user whether a task on the checklist 304 has been completed. Next, in box 606, the checklist application 202 sends the task completion data to the server 212 by way of a direct network connection to network 112 or presents a safety report local to the handheld computing device 201. The first path of the checklist application 202 then ends.

For a safety inspector user, the process path is the similar except for the type of checklist 304 obtained from the server 212. Additionally, the safety inspector may edit the checklist 304 as they wish. Still referring to FIG. 18, at box 610, the checklist application 202 obtains a checklist 304 from the server 212 for a safety inspector at a work site. Alternatively, the checklist application 202 may obtain the checklist 304 saved locally. The checklist 304 may include a plurality of safety inspection tasks to be performed at the work site. The checklist 304 may be stored in the checklist definitions 204 within the mass storage 203 of the handheld computing device 201. In box 612, the checklist 304 is displayed by the checklist application 202 on a display 106 of the handheld computing device 201 to the user. The display may be in response to some input provided by the user on the display 106 or may be performed automatically.

In box 614, the checklist application 202 obtains, by way of the display 106, confirmation from the user whether a task on the checklist 304 has been completed. Next, in box 616, the checklist application 202 sends the task completion data to the server 212 by way of a direct network connection to network 112 or presents a safety report local to the handheld computing device 201. The second path of the checklist application 202 then ends. The safety report allows the supervisor to review the job site history. It is envisioned that the checklists may be any kind of detailed job analysis and utilize the technology of the devices, such as cameras, to capture data regarding the job site for incorporation into the checklist.

Safety reports and analytics derived therefrom can be compared to separate safety reports and respective analytics of the same or different work sites. As such, completed checklists can be compiled on the server 212 or the hand held computing device 201 to provide a supervisor with safety data of all work site operations. Dynamic reporting allows enforcement tracking and key metrics allow visibility into inspections, training, and safety trends of a work site operation.

The flowchart of FIG. 18 shows the functionality and operation of an implementation of portions of the checklist application 202. If embodied in software, each block may represent a module, segment, or portion of code that includes program instructions to implement the sped fled logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 18 shows a specific order of execution, it is understood that the order of execution may differ from that which is depicted. For example, the order of execution of two or more blocks may be scrambled relative to the order shown. Also, two or more blocks shown in succession in FIG. 18 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

A variety of modifications of the teachings herein may be realized. Generally, modifications may be designed according to the needs of a user, designer, manufacturer or other similarly interested party. The modifications may be intended to meet a particular standard of performance considered important by that party.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an embodiment that is one of many possible embodiments.

While the disclosure has been described with reference to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A system, comprising:

a server-side computing device comprising at least one processor and a memory;

a handheld computing device located at a work site and comprising a processor, a memory, and a touchscreen display; and a management portal application executable on the server-side computing device, wherein execution of the management portal application causes the server-side computing device to:

(a) identify a management user;

(b) receive, for association with the work site, establishment data comprising physical-site parameter data including at least one of a roof pitch, a selected fall protection method, or a recorded hazard condition, wherein at least a portion of the physical-site parameter data is manually entered through the touchscreen display of the handheld computing device or imported from a third-party measurement software application;

(c) receive, from the management user through the management portal application, a customization to a master checklist, the customization specifying at least one of hazards or lack thereof at the work site, the roof pitch, the fall protection method to be used or a reason for no fall protection method, safety compliance of workers, or a safety evaluation of workers;

(d) apply the customization to the master checklist to generate, for the work site, a customized checklist including a plurality of safety analysis tasks and task-level execution conditions;

(e) transmit, to the handheld computing device, the customized checklist including the plurality of safety analysis tasks and the task-level execution conditions;

(f) obtain, from the handheld computing device, responses to the customized checklist, the handheld computing device being configured to:

(i) display, on the touchscreen display, a first user interface screen for a completion task that includes a first touch component marking the completion task as completed and a second touch component marking the completion task as not completed, (ii) display, on the touchscreen display, a second user interface screen for a numerical data entry task that includes a plurality of numerical touch components to enter a numerical value, and (iii) dynamically modify, based on at least one prior response and at least one corresponding task-level execution condition, a subsequently displayed portion of the customized checklist by causing at least one subsequent task to disappear or to not be presented;

(g) generate, based at least in part on the responses, a safety report for the work site; and (h) aggregate safety report data across a plurality of work sites or workers to generate at least one performance profile and output at least one of a score, a trend metric, or an alert notification indicating whether safety performance is adhered to as prescribed by the customized checklist.

2. The system of claim 1, wherein the customization includes identification of one or more hazard conditions or an indication of absence of hazard conditions at the work site, the hazard conditions being stored as structured hazard data and used to control inclusion or exclusion of at least one safety analysis task in the customized checklist.

3. The system of claim 1, wherein the customization includes a roof pitch associated with the work site, the roof pitch being received through a numerical data entry task presented on the touchscreen display of the handheld computing device.

4. The system of claim 1, wherein the customization includes selection of a fall protection method to be used at the work site or selection of a reason for no fall protection method, and wherein selection of the reason for no fall protection method causes the customized checklist to present at least one additional documentation task.

5. The system of claim 1, wherein the customization includes safety compliance criteria for workers at the work site, and wherein generating the safety report comprises indicating whether the safety compliance criteria are satisfied based on the responses to the customized checklist.

6. The system of claim 1, wherein the customization includes a safety evaluation category for workers at the work site, and wherein the safety report includes an evaluation record associated with an identified worker or crew.

7. The system of claim 1, wherein at least one of the plurality of safety analysis tasks is a completion task, and wherein executing the customized checklist causes the handheld computing device to:

(a) display, on the touchscreen display, a user interface including a first touch component that marks the completion task as completed and a second touch component that marks the completion task as not completed; and (b) in response to selection of the second touch component, automatically require entry of a justification input comprising at least one of a free-text comment, a categorical reason selection, or an image capture before permitting progression to any subsequent safety analysis task.

8. The system of claim 1, wherein at least one of the plurality of safety analysis tasks is a numerical data entry task, and wherein executing the customized checklist causes the handheld computing device to:

(a) display, on the touchscreen display, a plurality of numerical touch components to receive a numerical value associated with the work site;

(b) validate the numerical value against at least one predefined threshold or category range stored as part of the customized checklist; and (c) based on the validation, automatically trigger inclusion or exclusion of at least one subsequent safety analysis task relating to hazard documentation, fall protection selection, or supervisory review.

9. A method of evaluating and enforcing safety performance of workers at a work site, the method comprising the steps of:

(a) identifying, by a server-side computing device comprising a processor and a memory, a management user and associating the management user with a checklist configuration profile;

(b) receiving, from the management user through a management portal application executed by the server-side computing device, a customization to a master checklist;

(c) receiving, for association with the work site, physical-site parameter data, the physical-site parameter data being manually entered through a touchscreen of a handheld computing device at the work site or imported from a third-party software application and stored as establishment data for the work site;

(d) applying, by the server-side computing device, the customization and the establishment data to the master checklist to generate a customized checklist for the work site, the customized checklist defining a plurality of safety analysis tasks and task-level execution conditions;

(e) transmitting the customized checklist to the handheld computing device;

(f) executing, at the handheld computing device, a checklist workflow in which user interface components presented on the touchscreen are dynamically controlled based on responses entered to prior safety analysis tasks, including preventing display of at least one subsequent task unless a corresponding task-level execution condition is satisfied;

(g) obtaining, from the handheld computing device, responses to the customized checklist entered through the dynamically controlled user interface; and (h) generating, by the server-side computing device, a safety report for the work site based at least in part on the responses, and aggregating the safety report with safety reports from other work sites to compute at least one performance metric or alert condition indicative of safety performance adherence.

10. The method of claim 9, wherein the customization specifies one or more parameters selected from the group consisting of: hazards or lack thereof present at a work site;

a pitch of a roof at the work site; a fall protection method to be used or a reason for no fall protection method; safety compliance of workers at the work site; and a safety evaluation category for workers at the work site, the specified parameters being applied to generate the customized checklist.

11. The method of claim 9, wherein the pitch of the roof at the work site is manually entered through the touchscreen of the handheld computing device or imported from a third-party measurement software application.

12. The method of claim 9, further comprising outputting the safety report for display on the touchscreen of the handheld computing device or transmitting the safety report to the server-side computing device for storage or presentation through the management portal application.

13. The method of claim 9, wherein at least one of the plurality of safety analysis tasks is a completion task, and wherein executing the checklist workflow at the handheld computing device comprises: displaying, on the touchscreen, a completion-task user interface including (i) a first touch component that marks the completion task as completed and (ii) a second touch component that marks the completion task as not completed; and, in response to selection of the second touch component, requiring entry of a justification input comprising at least one of a free-text comment, a categorical reason selection, or an image capture before permitting progression to any subsequent safety analysis task.

14. The method of claim 9, wherein at least one of the plurality of safety analysis tasks is a numerical data entry task, and wherein executing the checklist workflow at the handheld computing device comprises: displaying, on the touchscreen, a numerical-entry user interface including a plurality of numerical touch components to receive a numerical value associated with the work site; validating the numerical value against at least one predefined threshold or category range stored in the customized checklist; and, based on the validating, automatically controlling presentation of at least one subsequent safety analysis task by causing the at least one subsequent safety analysis task to be included or excluded from display, the at least one subsequent safety analysis task relating to hazard documentation, fall protection selection, or supervisory review.

* * * * *